Nov. 26, 1935. W. KNAPP 2,022,289
TOOL HOLDER
Filed April 5, 1934 2 Sheets-Sheet 1

WITNESS:

INVENTOR
Walter Knapp
BY
Augustus B. Stoughton
ATTORNEY.

Nov. 26, 1935.　　　　W. KNAPP　　　　2,022,289
TOOL HOLDER
Filed April 5, 1934　　　2 Sheets-Sheet 2

WITNESS:

INVENTOR
Walter Knapp
BY
Augustus B. Stoughton
ATTORNEY.

Patented Nov. 26, 1935

2,022,289

UNITED STATES PATENT OFFICE 2,022,289

TOOL HOLDER

Walter Knapp, Lancaster, Pa.

Application April 5, 1934, Serial No. 719,111

2 Claims. (Cl. 143—6)

Many tool holders include in their construction an arm mounted for rising and falling movement and for turning movement in a horizontal plane in respect to a vertical axis. In constructions, with which I am familiar, the vertical axis consisted of a standard movable in respect to a fixed pedestal, and the arm was turnable in a horizontal plane about the standard. This construction required two joints each having finished surfaces. The principal object of the present invention is to cheapen and improve the accuracy of such tool holders, and to this and other ends hereinafter set forth or appearing the invention, generally stated, comprises a rigidly mounted standard having a single finished cylindrical joint surface, an arm having a single finished cylindrical joint surface, said finished joint surfaces arranged in sliding and turning contact, and a hand operated lifting and lowering screw mechanism turnably mounted on top of the standard and connected with the arm.

The invention also comprises the improvements to be presently described and finally claimed.

In the following description reference will be made to the accompanying drawings forming part hereof and in which, Figure 1 is an elevational view partly in section of a tool holder embodying features of the invention, Figure 2 is a similar view drawn to an enlarged scale and illustrating a modification.

Figure 3:
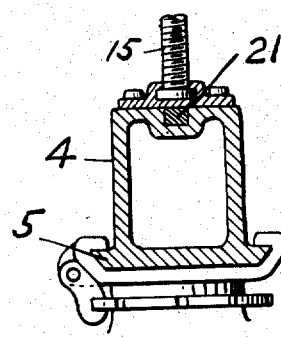
Figure 3 is a transverse section taken on the line 3—3 in Fig. 1.
Figure 2:
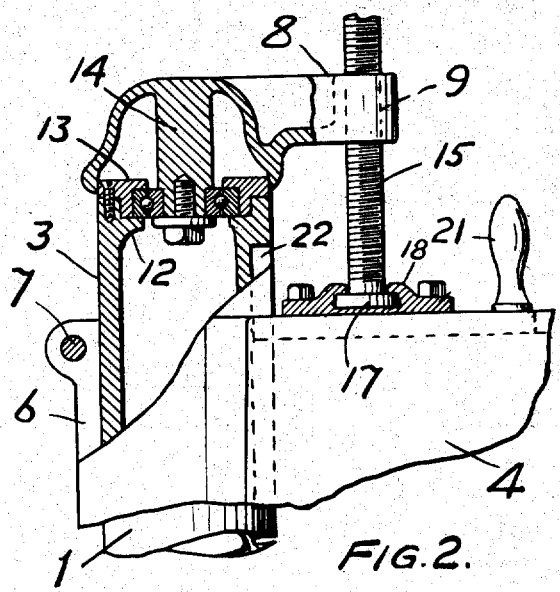
Figure 1:
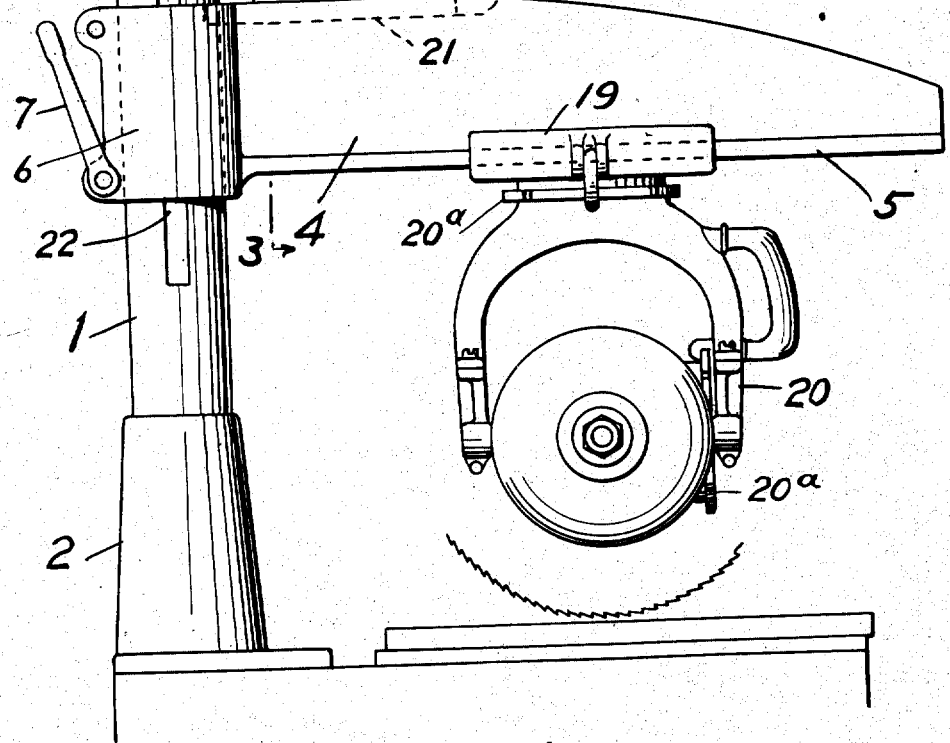

Referring to the drawings, and more particularly to Figure 1, 1 is a standard shown as of tubular form and it is rigidly mounted on a pedestal 2. The standard 1 is provided with a single, finished, cylindrical, joint surface 3. 4 is an arm shown as provided at its lower edge with a rail 5, and this arm 4 is provided with a single finished cylindrical joint surface provided within the ring portion 6 of the arm which surrounds the finished joint surface 3. The portion 6 of the arm is shown as split and provided with a clamping means 7 by which it can be secured to and released for movement in respect to the standard 1. The arm 4 is provided with a slidable key 21, which, by engaging splines or elongated grooves 22, spaced forty-five degrees apart and provided in the standard 1, serves to hold the arm 4 against turning in positions spaced forty-five degrees apart; for intermediate positions use is made of the clamp 7. The finished joint surfaces are arranged in sliding and turning contact. The fact that there are but two finished joint surfaces provides an economical construction and insures accuracy of operation. 8 is a second arm which is shorter than the arm 4 and it is provided with a threaded opening 9. The arm 8 is turnably mounted on the standard 1 and, as shown it is connected to one element of an annular ball bearing of which the other element is connected with the standard. The amount of angular movement is indicated by pointer 25 and scale 26. As shown in Figure 1 a post 10 is mounted as a cap on the standard 1 and the post is connected with the inner race of the ball bearing, the outer race of the ball bearing is connected with the arm 8 and secured thereto by a plate 11. As shown in Figure 2 the outer race of the annular ball bearing is connected with the standard by a flange 12 and plate 13. The inner race of the annular ball bearing is connected with the arm 8 by a post 14. 15 is a screw which engages the threaded opening 9 in the arm 8 and it is provided at one end with a handle 16 and at the other end with a head 17 which is turnably mounted in the fitting 18 applied to the top of the arm 4. 19 is a carriage slidable on the rail 5 and from it depends the adjustable motor support 20 having pivots arranged ninety degrees apart and provided with dial adjustments 20ª.

The purpose of the screw 15 is to raise and lower the arm 4 on the standard and to support it from the arm 8 for turning movement.

Figure 4:
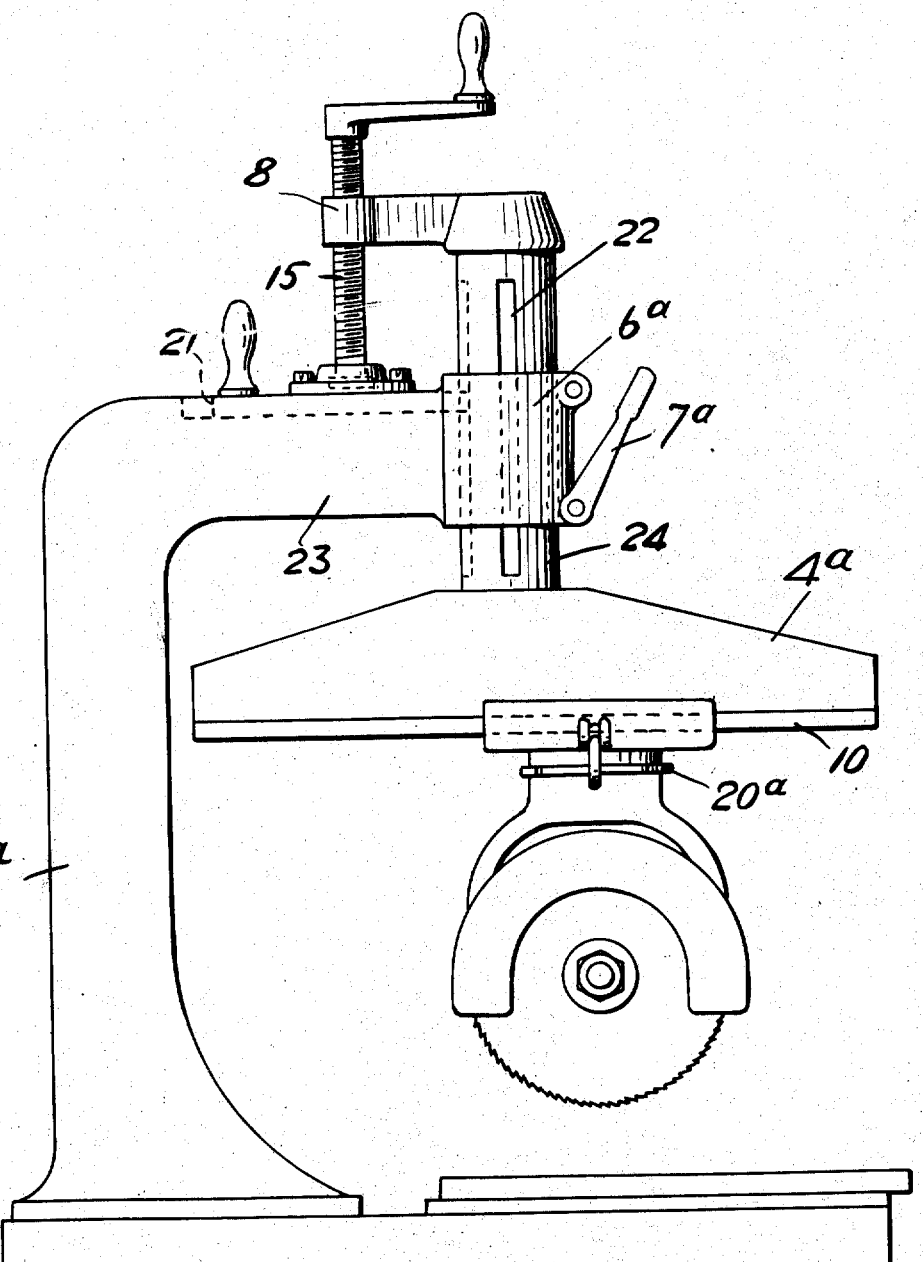
Figure 4 is a view similar to Figure 1 illustrating another modification.

The construction and mode of operation of the modification shown in Figure 4 are as above described except as follows:

The standard 1ª is provided with an overhanging portion 23 which is equipped with the split sleeve 6ª and with the clamping means 7ª and the arm 4ª is provided with a cylindrical post 24 having grooves 22 spaced forty-five degrees apart for cooperation with the key 21. The finished cylindrical joint surfaces are arranged between the post 24 and the split ring head 6ª. The screw 15 is mounted on the standard 1ª, and the arm 8 is connected by a bearing with the post 24 for turning but not for endwise motion.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. A tool holder comprising in combination a rigidly mounted standard having a single finished cylindrical joint surface, an arm having a single finished cylindrical joint surface, said finished joint surfaces arranged in sliding and turning contact, a hand operated screw lifting and lowering mechanism mounted on top of the standard and turnably connected with the arm, and a removable key and its complemental splines interposed between the standard and arm.

2. In a machine of the type recited the combination of a standard, an arm, single finished joint surfaces arranged in turning and sliding contact and provided respectively on the arm and standard, one of said joint surfaces being a clamp, and a removable key and its complemental splines interposed between said surfaces, said splines spaced apart, whereby large adjustments are made by the key and splines and intermediate adjustments are made by the clamp.

WALTER KNAPP.